United States Patent [19]
Martin

[15] 3,701,503
[45] Oct. 31, 1972

[54] PARACHUTE HARNESS AND RELEASE MECHANISM THEREFOR
[72] Inventor: James Martin, Southlands Manor, Southlands Road, Denham, near Uxbridge, Middlesex, England
[22] Filed: March 22, 1971
[21] Appl. No.: 126,614

[30] Foreign Application Priority Data
April 16, 1970 Great Britain..........18,238/70

[52] U.S. Cl. ............................................244/122 AD
[51] Int. Cl. .............................................B64d 25/10
[58] Field of Search.....244/122 AD, 122 A, 122 AB, 244/122 AC, 141

[56] References Cited
UNITED STATES PATENTS
2,671,622  3/1954  Saulnier.................244/141 X
3,222,015  12/1965  Larsen et al. .......244/122 A X
3,361,397  1/1968  Valentine............244/122 AD
3,606,221  9/1971  Morris et al.........244/122 AD Primary Examiner—Milton Buchler
Assistant Examiner—Carl A. Rutledge
Attorney—Kurt Kelman

[57] ABSTRACT

The invention concerns an ejection seat escape installation for providing escape from a vehicle where it is not possible to provide an escape opening directly above an ejection seat, the installation being particularly applicable to rotor aircraft such as a helicopter, the installation comprising at least one ejection seat carried by a frame, means angularly to incline the seat and the frame and a rocket motor to cause the ejection seat to deviate from the trajectory which it would normally take under the influence of the standard ejection gun of the seat.

6 Claims, 3 Drawing Figures

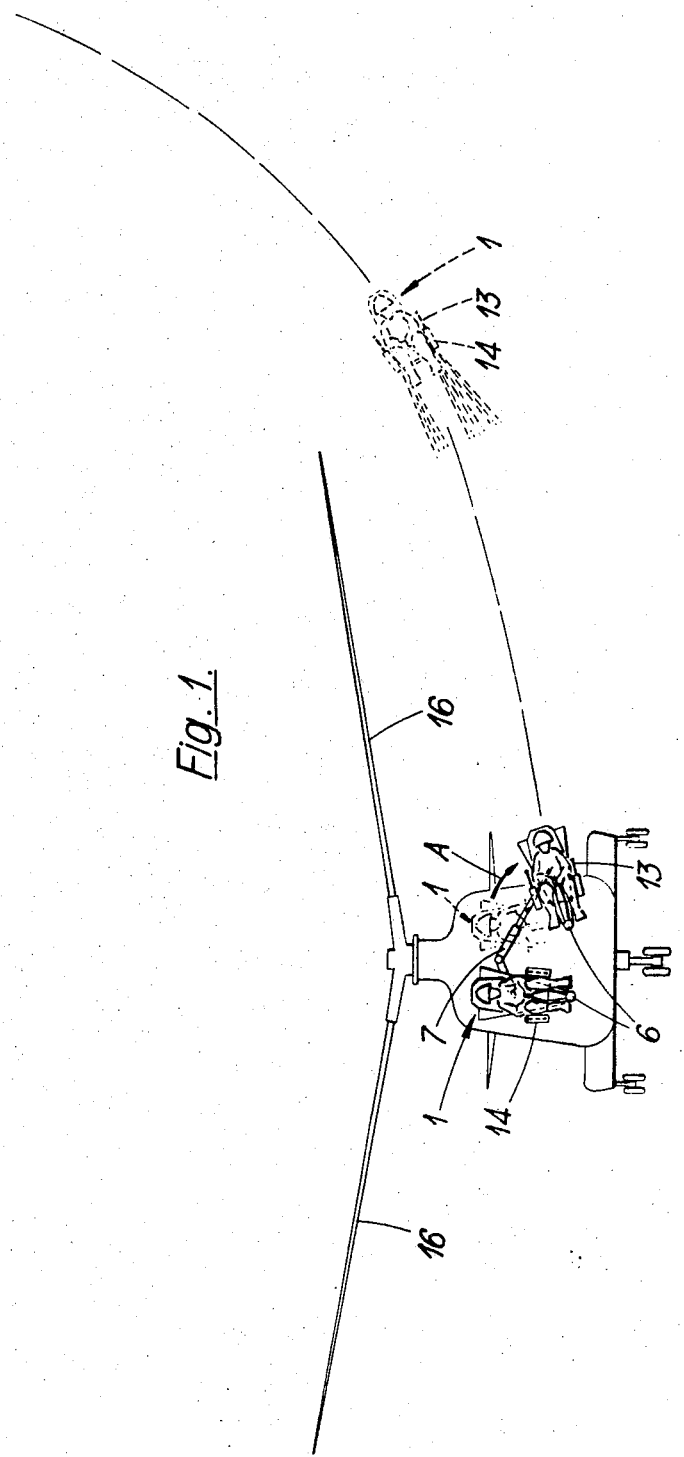

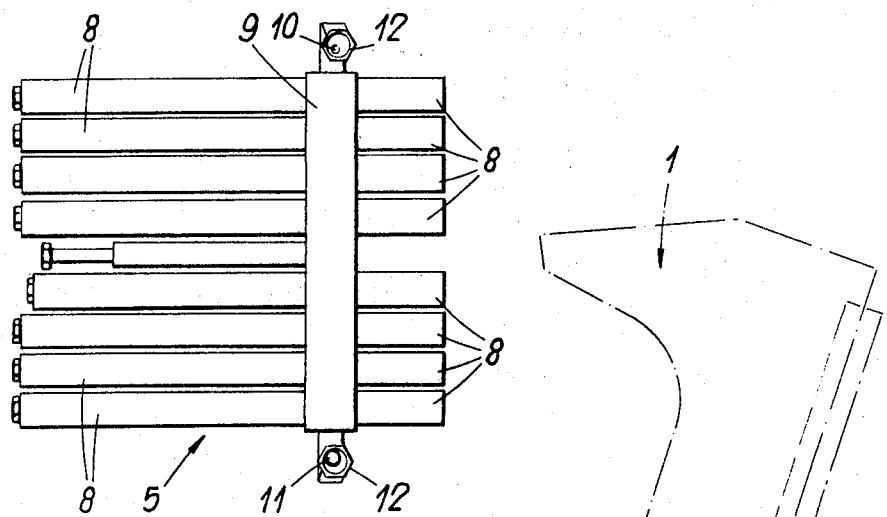
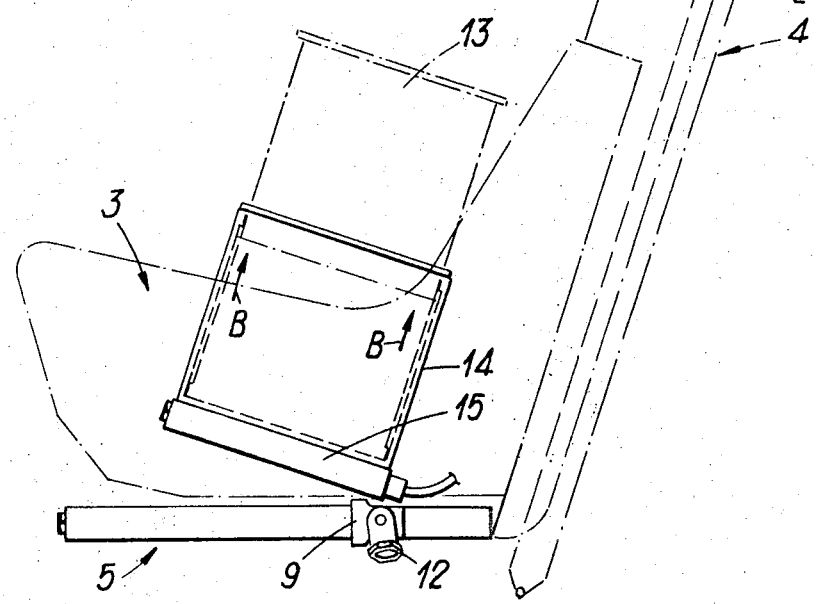

PARACHUTE HARNESS AND RELEASE MECHANISM THEREFOR

This invention concerns ejection seat escape installations.

It will be understood that in certain instances it is not possible to provide an escape opening immediately above the position of an ejection seat.

Thus one object of this invention is to provide a system which will permit safe escape from a vehicle where no opening can be provided above the ejection seat. One typical condition from which escape is difficult is where more than one ejection seat is placed adjacent, yet not immediately beneath, a single escape hatch or opening of a size sufficient for only one seat to pass therethrough at one time.

Thus broadly in accordance with this invention there is provided an ejection seat installation comprising an ejection seat having an ejection gun and a rocket motor, said ejection seat being mounted upon an angularly movable frame, means being provided to move said frame angularly from a normal seating position to a sidewardly inclined position to align said seat with an escape opening in a vehicle in which the installation is to be fitted.

The invention especially concerns ejection seat installations for enabling the safe escape of airmen from a helicopter.

It is well known to provide ejection seats for facilitating the escape of airmen from aircraft but, it will be appreciated that the escape from rotor aircraft, for example, helicopters is made more difficult by the presence of the helicopter rotor which rotates above the helicopter cockpit. Thus escape in an ejection seat upwardly from the cockpit is not possible because of the clearly severe risk of collision of the ejection seat and airmen with the rotor. Equally escape in an ejection seat downwardly from the cockpit is unsatisfactory insofar that downward ejections can only be carried out with any reasonable degree of safety at very high altitudes and apart from the fact that helicopters rarely operate at high altitudes this downward ejection system could not provide a zero or near zero altitude safe ejection capability.

A further object of this invention is therefore to provide a new or improved ejection seat escape installation to enable safe escape of airmen from helicopters.

Thus more specifically, and according to another aspect of this invention, there is provided an ejection seat installation comprising an ejection seat having an ejection gun and a rocket motor, said ejection seat being mounted upon an angularly movable frame, means being provided to move said frame and seat angularly from a normal seating position to a sidewardly inclined position and said rocket motor being arranged to produce a thrust inclined sidewardly to the direction of thrust of the ejection gun, the arrangement being such that on initiation of the ejection seat firing sequence such seat is first moved angularly in said sideways direction whereupon the ejection gun is fired and simultaneously or shortly thereafter said rocket motor is ignited, the thrust of said rocket motor being sidewardly inclined to the initial direction of thrust of the ejection gun so that the seat/airman combination is urged to follow an upwardly directed curvilinear trajectory.

Expediently said rocket motor may have its outlet nozzle or nozzles located beneath the seat pan of the ejection seat, such rocket motor outlet nozzles or nozzles being inclined with respect to the ejection gun thrust line.

Conveniently a plurality of rocket motor propellant-containing canisters are provided to create a rocket motor pack, and in addition to the provision of said inclined nozzle(s) or alternatively thereto, the pack is provided with at least two spaced apart outlet nozzles, one nozzle being of a greater diameter than the other so that an asymmetrical thrust is provided which applies a sideways tilting moment to the seat.

Alternatively, however, the rocket motor may merely be provided with one or more outlet nozzles which are inclined to the thrust line of the ejection gun and such rocket motor may be positioned at, or near, the head or upper part of the seat. It will be appreciated that more than one rocket motor or a pack of rocket motors may be applied to such head of the seat.

Still further it will be understood that a rocket motor(s) may be provided beneath the seat pan as well as a rocket motor(s) at the head of the ejection seat.

For example the thrust of the rocket motor positioned beneath the seat pan may be chosen to be symmetrical or asymmetrical but to supplement the thrust of the ejection gun and adjustment of the seat trajectory to lift the same may be effected or aided by one or more rockets provided, for example, at the top or head of the seat and having sidewardly directed thrust lines.

In order that the invention may be more readily understood one embodiment of ejection seat escape system for enabling escape from a helicopter will now be described, by way of example and with reference to the accompanying drawings in which:

FIG 1 is a diagrammatic front elevation of a two seater helicopter provided with ejection seats in accordance with this invention;

FIG. 2 is a diagrammatic side elevation of one such ejection seat; and

FIG. 3 is an underneath plan view of a rocket motor pack of the seat.

Whilst at least two airmen normally comprise the crew of a helicopter and they are seated side-by-side in the cockpit of the helicopter as shown in FIG. 1, for the sake of convenience and clarity the escape installation for one only of the crew members will be described hereinafter although certain parts of both ejection seats in FIG. 1 will be provided with reference numerals.

The system comprises an ejection seat 1 comprising a basic seat frame 2 carrying thereon a seat pan 3. The frame is provided with an ejection gun 4 extending upwardly along the back thereof (between a pair of beams in a known manner) and a rocket motor pack 5 is located beneath the pan 3 of the seat 1. Such a general form of ejection seat construction is well known and is clearly described in, for example, the specifications of my U.S. Pat. Nos. 3,186,662; 3,124,324; and application No. 708,201.

In the present construction however the ejection seat 1 including the seat frame 2 and gun 4 is pivotally connected to the helicopter structure so as to be capable of being moved from a position in which the seat 1 is in its normal operational upright position (i.e. with the airman seated upright in the seat) to a sidewardly inclined position as shown in FIG. 1 where the seat is disposed approximately 80° from said operational position after movement in the direction of arrow A.

Movement of the seat as a whole to this inclined position may be effected in many ways but conveniently the seat is supported at its base on a single pivot point 6 on the floor of the helicopter and the seat is moved about such pivot point 6 in response to the action of extendible hydraulic or other pressure fluid operated rams only diagrammatically shown and designated 7.

In this embodiment the rocket motor pack 5 comprises a plurality of propellant containing canisters 8 interconnected by a common spine 9 which is provided at opposite ends with outlets 10, 11 encircled by thrust nozzles. The diameters of the outlets 10, 11 which are located at opposite ends of spine 9 are of different diameters, the outlet 11 being larger than the outlet 10 so that an asymmetrical thrust will be provided by the rocket motor pack as a whole and one side of the seat will tend to tilt sideways under the effect of the rocket motor pack once it is ignited.

To avoid serious displacement of the user of the seat during the 80° tilting of the seat 1 during the escape procedure, side guards 13 normally stowed in flat containers 14 situated on at least one side of the seat pan are deployed. Deployment may be effected either by release of a spring mechanism or, as indicated in FIG. 2 by pressure fluid introduced into the container 14 from a canister 15.

In an emergency, an airman desiring to leave his helicopter would merely actuate the ejection seat firing mechanism which would first cause opening or jettisoning of the side door of his cockpit, would simultaneously cause the deployment of side guards 13 in the direction of arrows B to prevent sideways displacement of the airman during ejection, would then cause unlocking of the upper portion of the ejection seat from the helicopter structure whereupon the rams 7 referred to above would be extended so that the seat 1, and the airman seated therein, will be moved angularly in the direction of arrow A so that the upper end of the seat 1 protrudes through the opening in the side of the helicopter cockpit. When this stage is reached in the ejection sequence the seat 1 is locked in position either by locking of the rams 7 or 6 by a separate lock mechanism and the ejection gun 4 is fired so that the seat would be thrust in a direction sideways of the helicopter in a slightly upwardly inclined direction (at least when the helicopter is in a horizontal position). The thrust direction is selected so that when compensated by gravity the trajectory followed by the seat/airman combination would not coincide with the path of movement of the helicopter rotor 16.

It will be understood that the upward inclination of the trajectory cannot be very substantial if the rotor 16 is to be cleared and an additional increase in the height of the trajectory is thus essential and such increase is effected by ignition of the rocket motor 5, the asymmetrical thrust generated by the unequal diametered outlets 10, 11 of the said rocket motor 5 causing the trajectory height to be substantially increased as shown diagrammatically in FIG. 1.

In certain instances it may be desirable to provide the rocket motor 5 with a symmetrical thrust or to dispense with a rocket motor 5 beneath the seat pan 3 altogether and in such an instance a rocket motor would be provided towards the head of the seat, the thrust line of this rocket being chosen so that it is substantially transverse to the general direction of the thrust line of ejection seat gun.

It will be understood that time delay mechanisms could conveniently be incorporated into the seat so that the rocket motor would not become effective until the ejection seat lies outside the circle defined by the rotor.

It should be understood that in dependence upon the particular trajectory required for any particular helicopter escape the extent of angular movement of the seat prior to the ejection gun being fired may be varied as can the extent of asymmetry of the thrust of any rocket motor positioned beneath the seat pan of the ejection seat. Likewise the thrust, thrust direction and initiation time of any additional or alternatively provided transversely directed rockets at the head of the seat may be adjusted to suit particular trajectory requirements.

Where the helicopter is provided with a two ejection seat installation as shown in FIG. 1 then all the ejection steps may be carried out simultaneously for both seats, the seats leaving the helicopter from opposite sides of the cockpit.

Very conveniently the seats in such an installation would be operatively intercoupled so that operation by either airman of the ejection sequence of his seat is automatically transmitted to the seat of the other airman so that simultaneous ejection can take place with a minimum of delay.

It will be understood that the other known features of my ejection seats would be utilized such as automatic tensioning of the airman's seat harness.

Once ejection has taken place automatic deployment of the parachutes would take place after the ejection seats has cleared the path of the rotor and has reached a sufficiently high position along its trajectory.

Whilst the parachute could be deployed in any known manner by means of, for example, a drogue gun etc., conveniently a static line would be coupled to the helicopter structure which static line would also be coupled to a main parachute deploying mechanism carried by the seat so that the parachute may be extracted and deployed very rapidly at precisely the correct time. In the case of escape from helicopters (as opposed to escape from high speed aircraft) it is possible to deploy the parachutes by means of a static line after the ejection seat has moved to a predetermined distance from the helicopter as helicopters tend to have an inherent stability even when their rotors are stopped and furthermore travel at low speeds where there is unlikely to be any danger of the main parachute opening explosively.

I claim:

1. An ejection seat installation comprising an ejection seat having:

an ejection gun; a rocket motor;

an angularly movable frame upon which said ejection seat is mounted;

means being provided to move said frame angularly from a normal seating position to a sidewardly inclined position to align said seat with an escape opening in a vehicle in which the installation is to be fitted.

2. An ejection seat installation comprising an ejection seat having:
an ejection gun;
a rocket motor;
an angularly movable frame upon which said ejection seat is mounted;
means being provided to move said frame and seat angularly from a normal seating position to a sidewardly inclined position;
said rocket motor being arranged to produce a thrust inclined sidewardly to the direction of thrust of the ejection gun;
the arrangement being such that on initiation of the ejection seat firing sequence such seat is first moved angularly in said sideways direction whereupon the ejection gun is fired and simultaneously or shortly thereafter said rocket motor is ignited, the thrust of said rocket motor being sidewardly inclined to the initial direction of thrust of the ejection gun so that the seat/airman combination is urged to follow an upwardly directed curvilinear trajectory.

3. An installation according to claim 2 wherein said rocket motor comprises:
a plurality of rocket motor propellant containing canisters;
a spine intercoupling such canisters;
structure of the spine defining two spaced apart outlet nozzles, one nozzle being of a greater diameter than the other so that an asymmetrical thrust is provided which applies said sideways tilting moment to the seat.

4. An installation according to claim 2, wherein
a rocket motor is provided;
structure of said motor defining at least one outlet arranged to provide a thrust line which is sidewardly inclined to the thrust line direction of said ejection gun on the seat.

5. An installation according to claim 3, wherein said rocket motor also supplements the thrust of the ejection gun.

6. A rotor vehicle such as a helicopter provided with at least one ejection seat installation in accordance with claim 1.

* * * * *